(12) United States Patent
Bilenko et al.

(10) Patent No.: US 8,930,289 B2
(45) Date of Patent: Jan. 6, 2015

(54) ESTIMATION OF PREDICTIVE ACCURACY GAINS FROM ADDED FEATURES

(75) Inventors: Mikhail Bilenko, Redmond, WA (US); Hoyt Adam Koepke, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 394 days.

(21) Appl. No.: 13/369,284

(22) Filed: Feb. 8, 2012

(65) Prior Publication Data

US 2013/0204809 A1 Aug. 8, 2013

(51) Int. Cl.
G06F 15/18 (2006.01)
(52) U.S. Cl.
USPC .......................................................... 706/12
(58) Field of Classification Search
None
See application file for complete search history.

(56) References Cited

U.S. PATENT DOCUMENTS

| | | | |
|---|---|---|---|
| 5,537,488 A | 7/1996 | Menon et al. | |
| 6,049,767 A * | 4/2000 | Printz | 704/240 |
| 7,644,094 B2 | 1/2010 | Heckerman | |
| 7,805,388 B2 | 9/2010 | Weston et al. | |
| 8,190,537 B1 * | 5/2012 | Singh et al. | 706/12 |
| 2005/0021317 A1 * | 1/2005 | Weng et al. | 703/2 |
| 2005/0256760 A1 | 11/2005 | Siddhanti | |
| 2006/0218110 A1 | 9/2006 | Simske et al. | |
| 2008/0133434 A1 | 6/2008 | Asar et al. | |
| 2010/0153315 A1 * | 6/2010 | Gao et al. | 706/12 |

OTHER PUBLICATIONS

Grafting: Fast, Incremental Feature Selection by Gradient Descent in Function Space Perkins et al Journal of Machine Learning Research 3 (2003) 1333-1356 Submitted May 2002; Published Mar. 2003.*
"Automated Reasoning on Feature Models" David Benavides, Pablo Trinidad, and Antonio Ruiz-Cortds Dpto. de Lenguajes y Sistemas Informaticos, University of Seville, Av. de la Reina Mercedes S/N, 41012 Seville, Spain Springer-Verlag Berlin Heidelberg 2005.*
Kietzmann, et al., "Incremental GRLVQ: Learning Relevant Features for 3D Object Recognition", Retrieved at <<http://ml.informatik.uni-freiburg.de/_media/publications/klr07.pdf>>, Aug. 2008, pp. 2868-2879.
Zhu, et al., "Ordered Incremental Training with Genetic Algorithms", Retrieved at << http://citeseerx.ist.psu.edu/viewdoc/download-?doi=10.1.1.98.6598&rep=rep1&type=pdf >>, Dec. 4, 2004, pp. 1239-1256.
Guyon, et al., "An Introduction to Variable and Feature Selection", Retrieved at << http://jmlr.csail.mit.edu/papers/volume3/guyon03a/guyon03a.pdf>>, Mar. 2003, pp. 1157-1182.

* cited by examiner

Primary Examiner — Wilbert L Starks
Assistant Examiner — Luis Sitiriche
(74) Attorney, Agent, or Firm — Sandy Swain; Judy Yee; Micky Minhas

(57) ABSTRACT

Various technologies described herein pertain to estimating predictive accuracy gain of a potential feature added to a set of features, wherein an existing predictor is trained on the set of features. Outputs of the existing predictor for instances in a dataset can be retrieved from a data store. Moreover, a predictive accuracy gain estimate of a potential feature added to the set of features can be measured as a function of the outputs of the existing predictor for the instances in the dataset. The predictive accuracy gain estimate can be measured without training an updated predictor on the set of features augmented by the potential feature.

20 Claims, 9 Drawing Sheets

| Example | Label | Prediction | Potential Feature d+1 | ... | Potential Feature d+k |
|---|---|---|---|---|---|
| Example 1 | $y_1$ | $\hat{y}_1$ | $x_{1,d+1}$ | ... | $x_{1,d+k}$ |
| ... | ... | ... | ... | ... | ... |
| Example n | $y_n$ | $\hat{y}_n$ | $x_{n,d+1}$ | ... | $x_{n,d+k}$ |

FIG. 5

ESTIMATION OF PREDICTIVE ACCURACY GAINS FROM ADDED FEATURES

BACKGROUND

In many mature learning applications, training algorithms are advanced and well-tuned, leaving the design of new, informative features (e.g., data attributes) as a driver of error reduction. Thus, predictive accuracy of machine learning systems can be improved by adding a potential feature that is informative to the prediction task. Pathways for designing new features vary widely, ranging from constructing functions combining existing features to adding features obtained from a previously unused data source. Conventionally, a new potential feature is typically evaluated by its augmentation to a presently used data representation, and re-running the training and validation procedures to observe a resulting difference in predictive accuracy. However, this complete retraining is oftentimes impractical, especially in large scale learning scenarios.

Traditional approaches for computing accuracy improvement obtained from adding a potential feature, where such approaches re-run the learning algorithm on labeled training data augmented by the potential feature can be computationally, logistically, and monetarily costly. Such costs associated with traditional approaches can hinder rapid experimentation in design and evaluation of potential features.

For example, many domains, such as web search and advertising, utilize sophisticated, computationally expensive learning algorithms and very large labeled datasets, imposing experimentation latency that is a barrier to rapid feature design. Thus, the traditional approaches that re-run the learning algorithm on the labeled data augmented by the potential feature can be computationally costly and time consuming. According to another example, industrial implementations of learning algorithms are typically components within large infrastructure pipelines, which can require significant domain expertise to run. Following this example, potential feature contributors lacking such expertise can be deterred from evaluating their features (e.g., features developed for a different application in the same organization) due to the complexity of adding the potential feature to the training pipeline (e.g., due to logistical costs). Pursuant to yet another example, in some domains, such as medical or marketing applications, potential feature values may be unavailable for the complete training set or may carry non-negligible costs, encouraging evaluation of feature relevance on a data subset before committing to obtaining values of the potential feature for all data (e.g., due to monetary costs).

SUMMARY

Described herein are various technologies that pertain to estimating predictive accuracy gain of a potential feature added to a set of features, wherein an existing predictor is trained on the set of features. Outputs of the existing predictor for instances in a dataset can be retrieved from a data store. Moreover, a predictive accuracy gain estimate of a potential feature added to the set of features can be measured as a function of the outputs of the existing predictor for the instances in the dataset. The predictive accuracy gain estimate can be measured without training an updated predictor on the set of features augmented by the potential feature. In accordance with various embodiments, the predictive accuracy gain estimate can further be measured as a function of labels for the instances in the dataset and values of the potential feature for the instances in the dataset.

According to various embodiments, values of a loss gradient of the existing predictor for the instances in the dataset can be computed based on the outputs of the existing predictor for the instances in the dataset and the labels for the instances in the dataset. An incremental predictor can be trained to predict the values of the loss gradient based on the values of the potential feature for the instances in the dataset. By way of illustration, the incremental predictor can be trained by maximizing a correlation between the values of the potential feature for the instances in the dataset and the values of the loss gradient. Further, performance of the incremental predictor can be evaluated to measure the predictive accuracy gain estimate of the potential feature added to the set of features. Moreover, in various embodiments, a bootstrap test can be performed to analyze statistical significance of a correlation between outputs of the incremental predictor and the values of the loss gradient.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 5 illustrates another exemplary dataset upon which incremental predictor(s) can be trained and predictive accuracy gain estimate(s) for potential features can be computed.

DETAILED DESCRIPTION

Figure 1:
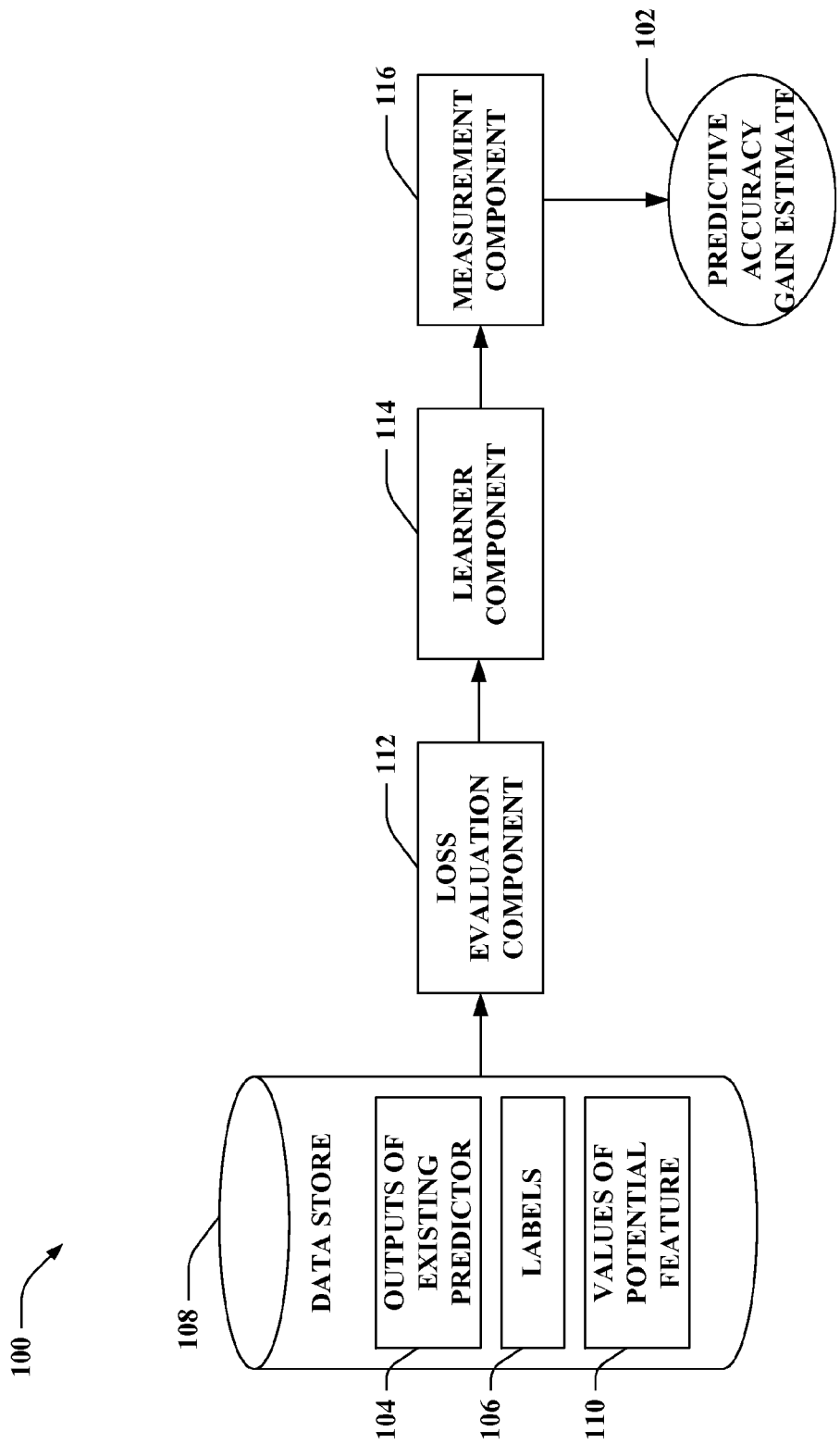
FIG. 1 illustrates a functional block diagram of an exemplary system that evaluates a predictive accuracy gain estimate of a potential feature without retraining a predictor on a set of features augmented by the potential feature.

Various technologies pertaining to estimating a predictive accuracy gain of a potential feature added to a set of features without complete retraining of a predictor on the set of features augmented by the potential feature are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, predictive accuracy gain from adding a potential feature to a data representation can be efficiently evaluated without complete retraining of a predictor. Thus, as part of feature evaluation where improvement of a previously trained predictor is sought by adding a potential feature to a data representation, predictive accuracy gain due to the potential feature can be efficiently estimated prior to complete retraining. Relevance of the potential feature can be analyzed by estimating whether adding the potential feature to the data representation can improve predictive accuracy on a given learning task. For instance, in many applications, identifying new informative potential features can be a primary pathway for improving performance of a predictor, yet traditional evaluation of a potential feature that can be added by retraining the predictor with the potential feature augmenting a set of features can be costly computationally, logistically, and financially, especially in large data settings. In contrast, as provided herein, relevance of a potential feature can be evaluated based on outputs of an existing predictor on labeled instances in a dataset (e.g., a training dataset, a validation dataset, etc.). The relevance of a potential feature can be analyzed as a dependency test of the potential feature to a residual of the existing predictor. Moreover, such evaluation technique can be learner-independent.

Referring now to the drawings, FIG. 1 illustrates a system 100 that evaluates a predictive accuracy gain estimate 102 of a potential feature without retraining a predictor on a set of features augmented by the potential feature. The predictive accuracy gain estimate 102 is an estimate of a potential contribution of the potential feature to predictive accuracy. Thus, the predictive accuracy gain estimate 102 can signify the potential contribution if the potential feature were to be added to a set of features and a predictor were to be trained on the set of features augmented by the potential feature.

The system 100 can be employed to generate the predictive accuracy gain estimate 102 for the potential feature, where the predictive accuracy gain estimate 102 can be utilized to triage whether to try to incorporate the potential feature with the set of features and train a predictor on the set of features augmented by the potential feature. For example, if a plurality of potential features is being considered for inclusion with the set of features, then respective predictive accuracy gain estimates (e.g., the predictive accuracy gain estimate 102) can be measured for each of the potential features in the plurality rather than complete retraining of a predictor for each of the potential features. Following this example, a subset of the plurality of potential features may be identified as candidates for possible incorporation with the set of features based on the respective predictive accuracy gain estimates. Accordingly, predictors need not be retrained for the remainder of the plurality of potential features identified as not being candidates for possible incorporation with the set of features based on the respective predictive accuracy estimates, thereby lessening incurred costs (e.g., computational, logical, monetary) in comparison to conventional approaches where predictors would be retrained for such potential features. By way of another example, a single predictive accuracy gain estimate (e.g., the predictive accuracy gain estimate 102) can be measured for more than one potential feature.

The system 100 relies on outputs of an existing predictor 104 for instances in a dataset to measure the predictive accuracy gain estimate 102. The dataset is a collection of instances, where each instance includes a set of features and a label. Hence, the dataset includes labels 106 for the instances. The labels 106 are target outputs to be predicted for the instances in the dataset. Formally, a dataset D that includes n instances, also referred to as n examples, can be represented as $D=\{(x_i, y_i)\}_{i=1 \ldots n}$, where each instance includes a set of features $x_i$ and a label $y_i$. It is to be appreciated that the dataset can include substantially any number of instances (e.g., n can be substantially any positive integer). The dataset, for example, can be a training dataset upon which the existing predictor is trained (e.g., by a learner (not shown)) or a validation dataset upon which the existing predictor is validated; however, it is to be appreciated that substantially any other dataset that includes a collection of labeled instances is intended to fall within the scope of the hereto appended claims.

The existing predictor may have been constructed by a learner (not shown) utilizing the dataset (e.g., training dataset) or a disparate dataset. The existing predictor is trained to take a set of features x and predict a corresponding value of y (e.g., generate an output of the existing predictor). According to an illustration, in email spam filtering, a training dataset is a collection of emails labeled as "spam" or "not spam" (e.g., "spam" can be encoded by y=1 and "not spam" can be encoded by y=0). An email in the training dataset can be described by a set of features x that capture various properties of the email. According to an illustration, the features in the set can take binary, discrete, numeric, or textual values, among others. Examples of features include whether a subject line of the email is written in all-capital letters (binary feature), how many occurrences of the word "pharmacy" are included in the email (numeric feature encoding a textual feature), or the like.

The system 100 need not have access to the existing predictor to measure the predictive accuracy gain estimate 102 for a potential feature. Moreover, the existing predictor need not be retrained to measure the predictive accuracy gain estimate 102 for the potential feature. Rather, the system 100 can utilize outputs of the existing predictor 104 for instances in a dataset to evaluate the predictive accuracy gain estimate 102 for the potential feature.

The system 100 includes a data store 108 that can retain the outputs of the existing predictor 104 for instances in the dataset. The system 100 can measure the predictive accuracy gain estimate 102 of a potential feature added to a set of features as a function of the outputs of the existing predictor 104 for the instances in the dataset. The predictive accuracy gain estimate 102 can be measured without training an updated predictor (e.g., without retraining the existing predictor) on the set of features augmented by the potential feature.

Further, the data store 108 can retain the labels 106 for the instances in the dataset. Moreover, the data store 108 can retain values of the potential feature 110 for the instances in the dataset. The system 100 can measure the predictive accuracy gain estimate 102 of the potential feature added to the set of features as a function of the outputs of the existing predictor 104 for the instances in the dataset, the labels 106 for the instances in the dataset, and the values of the potential feature 110 for the instances in the dataset. Moreover, the system 100 need not employ values of features in the set of features for instances in the dataset when measuring the predictive accuracy gain estimate 102 of the potential feature; however, in accordance with various embodiments, it is contemplated that the system 100 can exploit values of features in the set of features for instances in the dataset if such values are available to the system 100.

The system 100 includes a loss evaluation component 112 that computes values of a loss gradient of the existing predictor for the instances in the dataset. A loss gradient is also referred to herein as a gradient of a loss function. The loss evaluation component 112 can retrieve, from the data store 108, the outputs of the existing predictor 104 for the instances in the dataset, the labels 106 for the instances in the dataset, and/or the values of the potential feature 110 for the instances in the dataset. The loss evaluation component 112 can compute the values of the loss gradient based on the outputs of the existing predictor 104 for the instances in the dataset and the labels 106 for the instances in the dataset. Further, the loss evaluation component 112 can normalize the values of the loss gradient.

Predictive error of the existing predictor $f_0$ typically can be measured via a loss function L ($f_0(x)$, y), where $f_0(x)$ represents the outputs of the existing predictor 104 and y represents the labels 106. The claimed subject matter contemplates use of substantially any application-appropriate loss function. Examples of the loss function L include, but are not limited to, a log loss function, a cross-entropy function, a hinge loss function, a squared loss function, a normalized discounted cumulative gain (NDCG), or the like.

The loss evaluation component 112 can compute the values of the loss gradient, where the loss gradient can be based on a derivative of the loss function with respect to an output of a predictor. Thus, the gradient of the loss function can be determined by the loss evaluation component 112 by computing $$\Lambda = -\frac{1}{\sigma_\Lambda} \frac{\partial L}{\partial f} L(f, y) \bigg|_{f=f_0},$$

where $\Lambda$ is the gradient of the loss function, $\sigma_\Lambda$ is a normalization constant recentering $\Lambda$ to have unit variance, and f is a predictor. Accordingly, the loss evaluation component 112 can compute the values of the loss gradient for the instances in the dataset, $\Lambda = (\lambda_1, \ldots, \lambda_n)$, where $$\lambda_i = -\frac{1}{\sigma_\Lambda} \frac{\partial L}{\partial f} L(f, y_i) \bigg|_{f=f_0(x_i)},$$

for i=1, . . . , n (e.g., for the n instances in the dataset).

According to another example, it is contemplated that some losses may not be differentiable, and thus, the loss evaluation component 112 can provide a proxy value of the loss gradient for such losses. For instance, if the loss function is a cross-entropy function where L ($f_0(x)$, y)=y log($f_0(x)$)+ (1−y) log(1−$f_0(x)$), the loss evaluation component 112 can provide a proxy value of the loss gradient for $f_0(x)$=0 or $f_0(x)$=1. By way of a further example, it is to be appreciated that the loss evaluation component 112 can compute values of a pseudo gradient or a gradient estimate rather than values of the loss gradient; however, the claimed subject matter is not so limited.

The system 100 also includes a learner component 114 that trains an incremental predictor to predict the values of the loss gradient based on the values of the potential feature 110 for the instances in the dataset. The learner component 114 can be substantially any type of learner (e.g., supervised machine learner, etc.). The learner component 114 can select the incremental predictor from a class of predictors, where the incremental predictor maximizes a correlation between the values of the potential feature 110 for the instances in the dataset and the values of the loss gradient. Thus, the learner component 114 can select the incremental predictor by computing g=argmax E[g(x')$\Lambda$], where g is the incremental predictor (selected from the class of predictors), E is an expected value, and x' is the potential feature (e.g., the values of the potential feature 110).

Moreover, the system 100 includes a measurement component 116 that evaluates performance of the incremental predictor to measure the predictive accuracy gain estimate 102 of the potential feature added to the set of features. The predictive accuracy gain estimate 102 can be a binary value or a numeric value, where such binary value or numeric value can be used as a relative measure of potential gain of the predictive accuracy. The measurement component 116 can compute a correlation between outputs of the incremental predictor and the values of the loss gradient, E[g(x')$\Lambda$]. By way of example, the predictive accuracy gain estimate 102 can be the computed correlation. According to another example, the predictive accuracy gain estimate 102 can be a binary value based on the computed correlation (e.g., indicating that the outputs of the incremental predictor and the values of the loss gradient are either correlated or not correlated). Yet, it is to be appreciated that the claimed subject matter is not limited to the foregoing examples.

When the correlation between the outputs of the incremental predictor and the values of the loss gradient is non-zero (e.g., E[g(x')$\Lambda$]>0), then the predictive accuracy gain estimate 102 can signify that the potential feature likely improves predictive accuracy if an updated predictor were to be trained on the set of features in the dataset augmented by the potential feature. Otherwise, if the correlation is not greater than zero, then the predictive accuracy gain estimate 102 can signify that the potential feature likely does not improve the predictive accuracy if an updated predictor were to be trained on the set of features in the dataset augmented by the potential feature.

The system 100 tests for a variant of conditional independence to determine whether the potential feature is independent of the labels 106 given existing features in the set. If the potential feature is independent of the labels 106 given the existing features in the set, then the potential feature can be determined to not contribute information to improve prediction quality. More particularly, in the context of machine learning, the system 100 can determine whether inclusion of the potential feature will improve accuracy (e.g., reduce predictive error).

As noted above, error of a learned predictor f is typically measured via a loss function L(f(x), y), which for a dataset that includes labeled instances quantifies a degree of agreement between the labels 106 y and the outputs of the predictor f(x), penalizing divergence there between. Then, an alterna tive formulation for the problem of estimating relevance of the potential feature can be posed as evaluating the following:

$$L(f_0(x), y) \geq \min_f L(f(x, x'), y)$$

In the foregoing, f is a predictor trained using both the set of features x and the potential feature x', and $f_0$ is the existing predictor trained on the set of features x (without being trained on the potential feature x'). The foregoing can be relaxed to allow for efficient computation as follows:

$$L(f_0(x), y) \geq \min_g L(f_0(x) + g(x'), y)$$

In the above, g is the incremental predictor based on the potential feature (e.g., the incremental predictor is not based on features in the set of features x). As described above, an optimum incremental predictor g that minimizes combined loss can be obtained by the learner component 114 training the incremental predictor on the values of the potential feature 110 to estimate a gradient of the loss function determined by the loss evaluation component 112. The gradient of the loss function can be determined by the loss evaluation component 112 by computing $$\Lambda = -\frac{1}{\sigma_\Lambda} \frac{\partial L}{\partial f} L(f, y) \Big|_{f=f_0},$$

where $\Lambda$ is the gradient of the loss function and $\sigma_\Lambda$ is a normalization constant recentering A to have unit variance. Moreover, the incremental predictor g can be determined by the learner component 114 by computing g=argmax E[g(x')Λ].

Figure 2:
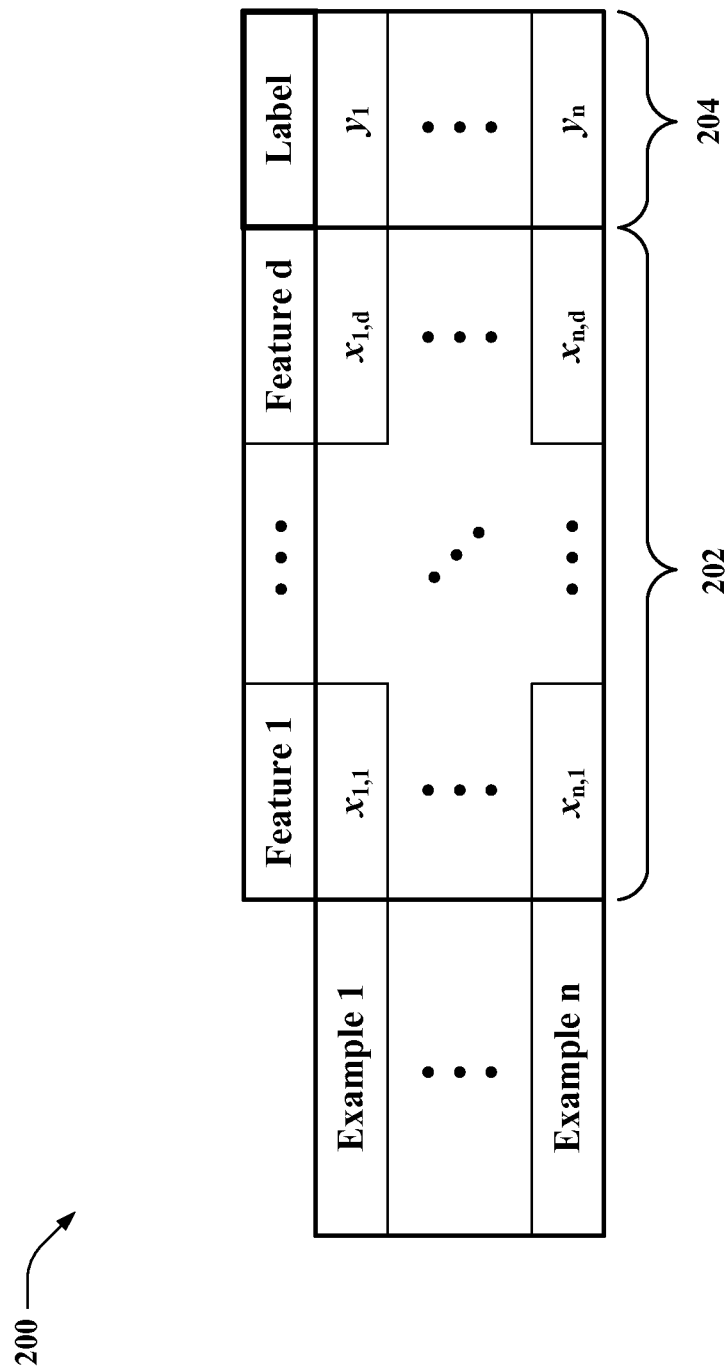
FIGS. 2-3 illustrate exemplary datasets.

Now referring to FIG. 2, illustrated is an exemplary dataset 200. The dataset 200 includes n examples (example 1, ..., example n), also referred to as n instances, where n is substantially any positive integer. Further, each of the n examples in the dataset 200 is associated with respective values for a set of features 202. As depicted, the dataset 200 includes d features (feature 1, ..., feature d), where d is substantially any positive integer. The d features are referred to herein as the set of features 202. In accordance with the illustrated example, example 1 is associated with a value of feature 1 $x_{1,1}$, ..., and a value of feature d, $x_{1,d}$, example 2 is associated with a value of feature 1 $x_{2,1}$, ..., and a value of feature d, $x_{2,d}$, and so forth. Moreover, the n examples in the dataset 200 are associated with corresponding labels 204 (e.g., the example 1 is associated with a label $y_1$, etc.).

According to an example, the dataset 200 can be a training dataset. Following this example, the dataset 200 can be inputted to a learner (e.g., learning algorithm). The learner can construct a predictor $f_0$ that predicts values of the labels 204 based on the set of features 202. Such predictor is referred to herein as the existing predictor. However, by way of another example, it is contemplated that the dataset 200 can be a validation dataset used to validate the predictor $f_0$.

Figure 3:
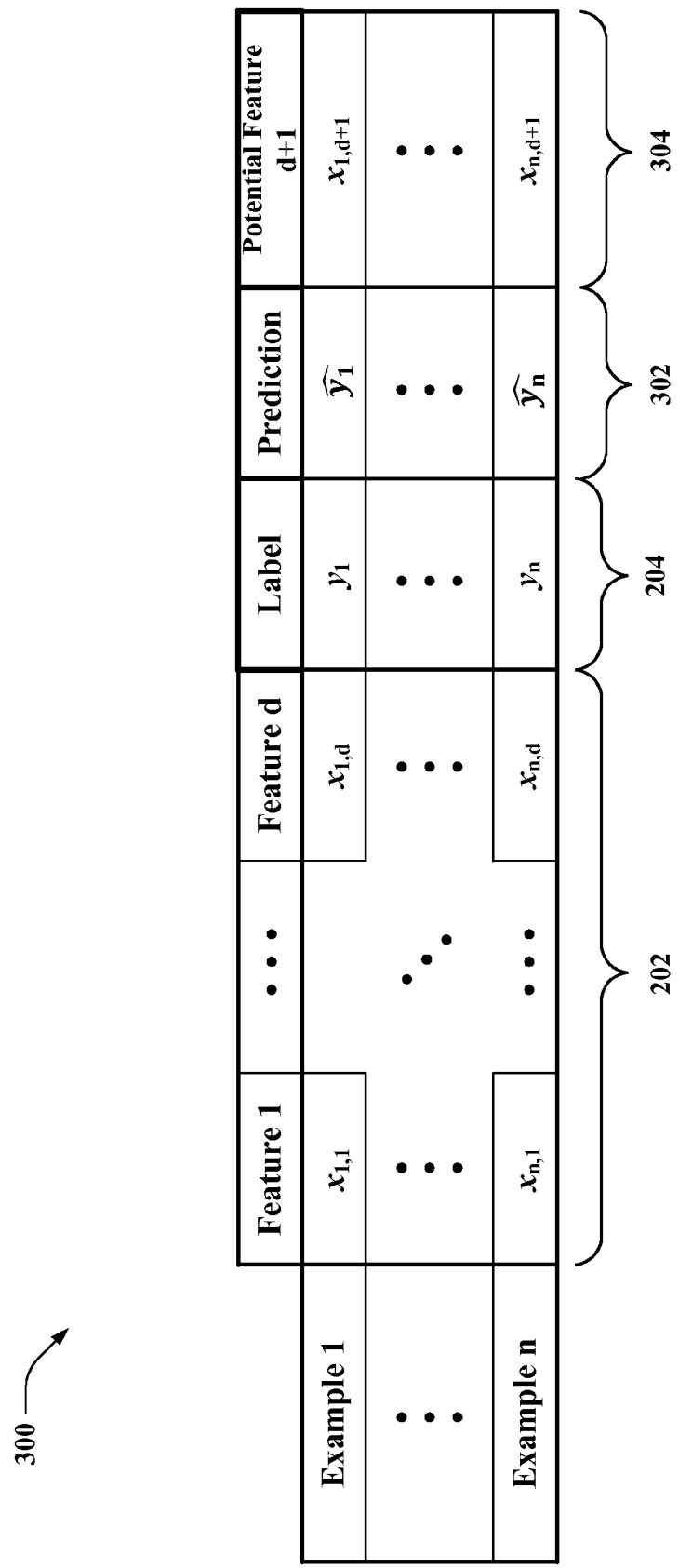

Turning to FIG. 3, illustrated is another exemplary dataset 300. The dataset 300 includes the set of features 202 and the labels 204 (e.g., from the dataset 200 of FIG. 2) augmented by outputs of an existing predictor 302 (e.g., the outputs of the existing predictor 104 of FIG. 1) and values of a potential feature 304 (e.g., the values of the potential feature 110 of FIG. 1) for the n examples. The potential feature (potential feature d+1) is not included in the set of features 202.

The outputs of the existing predictor 302 included in the dataset 300 are generated by the existing predictor $f_0$ based on the set of features 202. However, such outputs of the existing predictor 302 are not generated based on the values of the potential feature 304. It is contemplated that the dataset 300 can be a training dataset (e.g., the existing predictor $f_0$ may have been trained to predict the values of the labels 204 based on the set of features 202), a validation dataset (e.g., the existing predictor $f_0$ may have been validated by measuring an accuracy based on the labels 204 and the outputs of the existing predictor 302), or a disparate dataset that includes labeled examples.

Traditional approaches for measuring a predictive accuracy gain due to a potential feature (e.g., the potential feature d+1) being added to the set of features 202 commonly employ complete retraining of a predictor. According to an illustration, an engineer can propose a potential feature (e.g., the potential feature d+1) to be added to the set of features 202. Following this illustration, the set of features 202 can be augmented by the values of the potential feature 304, and a learner can be run on the set of features 202 augmented by the potential feature to construct an updated predictor $f_{0+1}$ that incorporates information from the potential feature. Further, such traditional approaches commonly compare accuracy of the updated predictor $f_{0+1}$ to accuracy of the existing predictor $f_0$, such that a difference there between is a contribution of the potential feature. For instance, such accuracies can be measured on held-out data (e.g., a validation dataset) or via cross-validation. However, for reasons set forth herein, these traditional approaches can be computationally, monetarily, and logistically costly.

Figure 4:
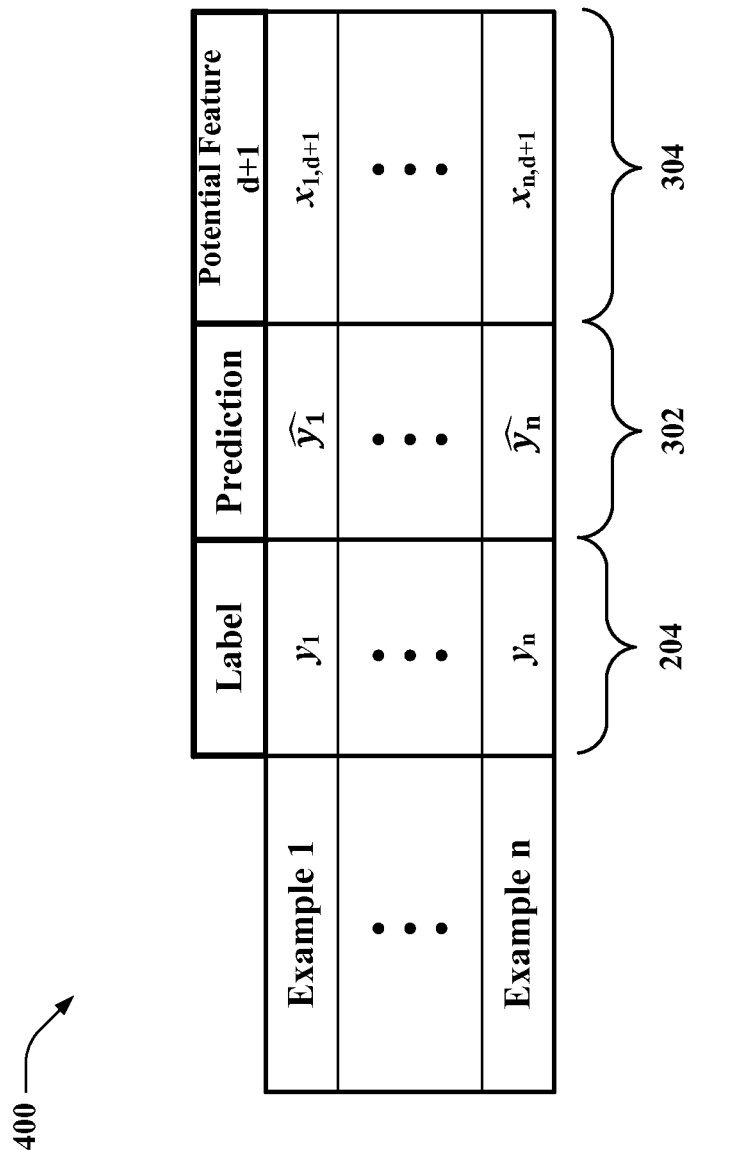
FIG. 4 illustrates an exemplary dataset upon which an incremental predictor can be trained and a predictive accuracy gain estimate for a potential feature can be computed.

Now turning to FIG. 4, illustrated is an exemplary dataset 400 upon which an incremental predictor can be trained and a predictive accuracy gain estimate for a potential feature can be computed. The dataset 400 includes the labels 204 for the n examples. Moreover, the dataset 400 includes the outputs of the existing predictor 302 (e.g., the outputs of the existing predictor 104 of FIG. 1) and the values of the potential feature 304 (e.g., the values of the potential feature 110 of FIG. 1) for the n examples. By way of example, the dataset 400 can be retained in the data store 108 of FIG. 1; however, the claimed subject matter is not so limited.

By way of illustration, for each of the n examples in the dataset 400, a value of a loss gradient of an existing predictor can be computed, thereby obtaining A. Values of the loss gradient can be evaluated based on the labels 204 for the n examples and the outputs of the existing predictor 302 for the n examples. Moreover, an incremental predictor can be trained to predict the loss gradient of the existing predictor based on the potential feature. Thus, the incremental predictor can be trained to predict the values of the loss gradient of the existing predictor based on the values of the potential feature 304. Further, performance of the incremental predictor can be measured. The performance can be measured by computing a correlation between outputs of the incremental predictor g(x') and values of the loss gradient A. If a non-zero correlation with A is computed, such that E[g(x')Λ]>0, then it can be determined that the existing predictor $f_0$ can be improved by incorporating the potential feature in the set of features and training an updated predictor (e.g., the potential feature can be identified as a candidate for possible incorporation with the set of features). Alternatively, if E[g(x')Λ]≤0, then it can be determined that the existing predictor $f_0$ may not be improved by incorporating the potential feature in the set of features and training an updated predictor.

Referring to FIG. 5, illustrated is another exemplary dataset 500 upon which incremental predictor(s) can be trained and predictive accuracy gain estimate(s) for potential features can be computed. The dataset 500 includes the labels 204 for the n examples and the outputs of the existing predictor 302 for the n examples. Moreover, the dataset 500 includes values of k potential features 502 for the n examples, where k can be substantially any positive integer. Similar to above, the dataset 500 can be retained in the data store 108 of FIG. 1; however, the claimed subject matter is not so limited.

According to an example, respective incremental predictors can be trained for each of the k potential features (e.g., a first incremental predictor can be trained to predict the values of the loss gradient of the existing predictor based on values of potential feature d+1, . . . , and a k-th incremental predictor can be trained to predict the values of the loss gradient of the existing predictor based on values of potential feature d+k). Following this example, respective predictive accuracy gain estimates can be computed for each of the k potential features based on performance of the respective incremental predictors. By way of another example, an incremental predictor can be trained for more than one of the k potential features (e.g., an incremental predictor can be trained to predict values of the loss gradient of the existing predictor based on values of two or more of the k potential features). In accordance with this example, the incremental predictor can be trained for the k potential features or a subset thereof. Moreover, a predictive accuracy gain estimate can be computed for the more than one of the k potential features based on performance of the incremental predictor.

Figure 6:
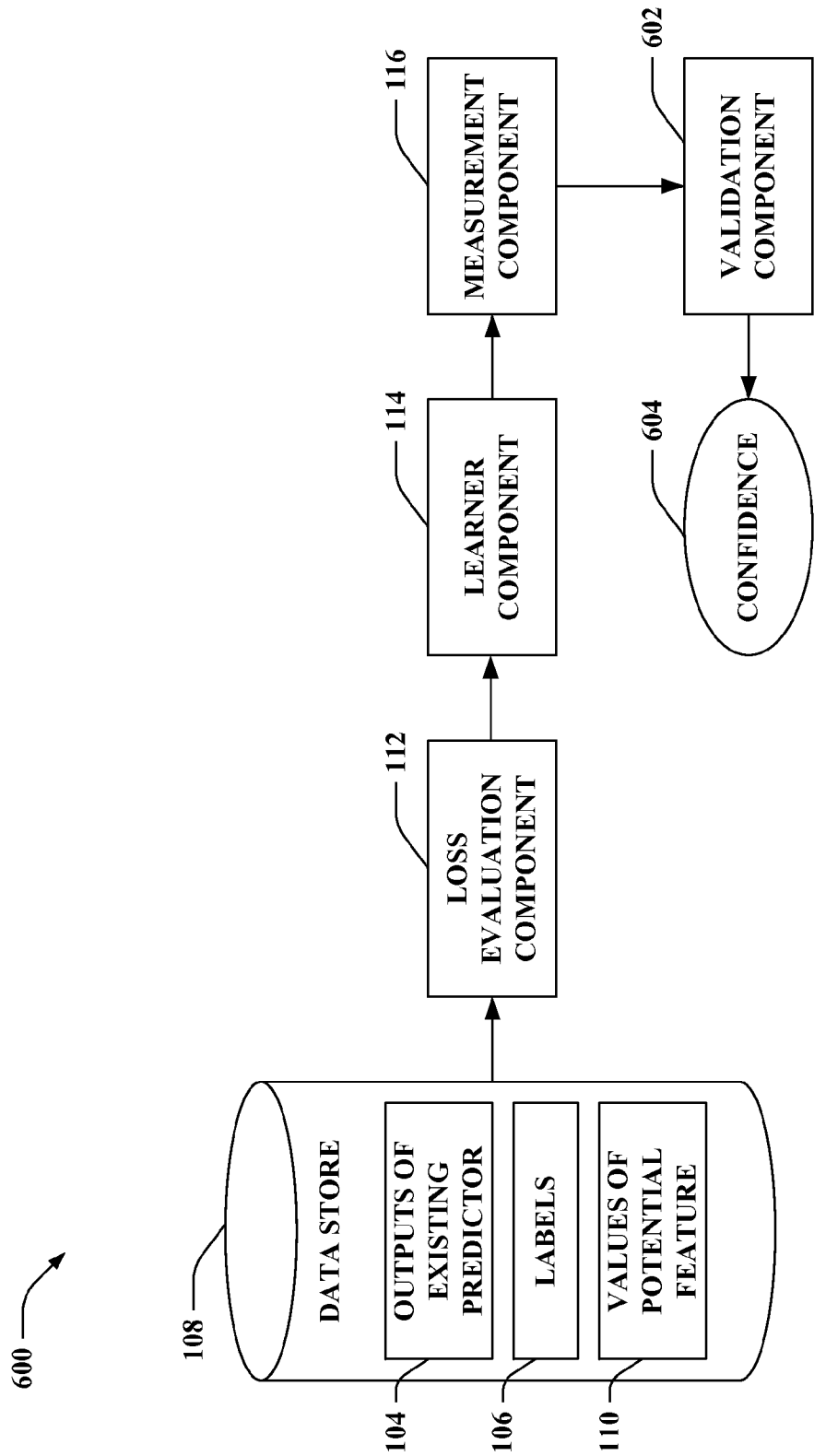
FIG. 6 illustrates a functional block diagram of an exemplary system that performs a bootstrap test to evaluate statistical significance of a predictive accuracy gain estimate of a potential feature.

With reference to FIG. 6, illustrated is a system 600 that performs a bootstrap test to evaluate statistical significance of a predictive accuracy gain estimate of a potential feature. The system 600 includes the data store 108, the loss evaluation component 112, the learner component 114, and the measurement component 116. Although not shown, it is contemplated that the measurement component 116 can output the predictive accuracy gain estimate 102 of FIG. 1. Moreover, the system 600 includes a validation component 602 that performs a bootstrap test to determine a confidence 604 that the potential feature improves the prediction of the existing predictor (e.g., the validation component 602 can analyze overfitting).

The validation component 602 tests whether the correlation between the outputs of the incremental predictor and the values of the loss gradient is non-spurious. Thus, the validation component 602 can account for the fact that the potential feature may give a predictor more flexibility, and thus, seemingly improve accuracy. While the foregoing is traditionally handled by separate training and validation datasets or using cross validation, the system 600 employs the validation component 602, which bootstraps a marginal distribution to create a null distribution, from which a valid hypothesis test can be constructed.

For example, the confidence 604 computed by the validation component 602 can be outputted by the validation component 602. According to another example, the predictive accuracy gain estimate computed by the measurement component 116 can be adjusted as a function of the confidence 604. By way of illustration, if the predictive accuracy gain estimate is a numeric value, then such numeric value can be adjusted based on the confidence 604 (e.g., difference between a correlation and an average bootstrap value can be computed). It is to be appreciated, however, that the claimed subject matter is not limited to the foregoing examples.

According to an illustration, the following sets forth exemplary pseudo code for a bootstrap test that can be performed by the validation component 602. It is to be appreciated, however, that the claimed subject matter is not limited to the below example.

---

Input: Data: $(x_i, y_i, f_0(x_i), x_i')$, $i = 1, ..., n$
Output: A p-value indicating confidence that $x_i'$ improves prediction
$\Lambda \leftarrow$ Gradient of loss function at $f_0(x)$;
$\hat{x}'^1, ..., \hat{x}'^N \leftarrow$ N i.i.d. samplings of n values from $(x_1', ..., x_n')$;
$\hat{\Lambda}^1, ..., \hat{\Lambda}^N \leftarrow$ N i.i.d. samples of n values from $(\lambda_1, ..., \lambda_n)$;
$t_0 \leftarrow T(x', \Lambda)$
for $j = 1, ..., N$ do $t_j \leftarrow T(\hat{x}'^k, \hat{\Lambda}^k)$
return Proportion of $t_j$ greater than $t_0$

---

As set forth in this algorithm, the inputted data can include the set of features $x_i$ for the n instances in a dataset (collectively referred to as x in the foregoing example), the labels $y_i$ for the n instances in the dataset, the outputs of the existing predictor $f_0(x_i)$ for the n instances in the dataset (collectively referred to as $f_0(x)$ in the foregoing example) and the values of the potential feature $x_i'$ for the n instances in the dataset (collectively referred to as x' in the foregoing example). However, in accordance with other embodiments, it is also contemplated that the set of features $x_i$ for the n instances in the dataset need not be provided as an inputted. The output of the above algorithm is a p-value indicating a confidence (e.g., the confidence 604) that $x_i'$ improves a prediction.

The gradient of the loss function at $f_0(x)$ can be computed (e.g., by the validation component 602) or provided as an input to the validation component 602 (e.g., computed by the loss evaluation component 112). The gradient of the loss function is referred to as $\Lambda$ in the above example.

In the foregoing bootstrap test example, the validation component 602 can create N independent bootstrap samples (e.g., random draws with replacement) of the values of the potential feature 110 (e.g., $\hat{x}'^1, ..., \hat{x}'^N$) and the loss gradient (e.g., $\hat{\Lambda}^1, ..., \hat{\Lambda}^N$). It is to be appreciated that N can be substantially any positive integer. Moreover, the validation component 602 can compute a fraction of times that a correlation of the bootstrap samples $t_j$ is lower than the actual correlation $t_0$ obtained from the values of the potential feature x' and the gradient of the loss function $\Lambda$. According to an example, T can represent training an incremental predictor based on the values of the potential feature 110 to predict the gradient of the loss function and computing a squared loss.

In general, techniques described herein relate to performing feature evaluation, where a learning algorithm is viewed as a black box which constructs a best-possible predictor given an existing data representation. Moreover, a computationally inexpensive procedure can be employed for determining whether a potential feature and prediction error are conditionally independent given existing features.

As set forth herein, feature evaluation relies on showing that a potential feature can potentially lead to predictive accuracy gains if an expected correlation between a fit to residuals of the potential feature and a shift- and scale-invariant transform of the loss gradient is non-zero. The foregoing can lead to a two-stage algorithm, which trains a predictor approximating the residuals using the potential feature (e.g., performed by the learner component 114), followed by hypothesis testing that establishes a significance of the observed correlation (e.g., performed by the measurement component 116). Moreover, it is contemplated that this procedure can be easily parallelizable, fast (relative to retraining), and can work on sub-sampled dataset, making it particularly appropriate for a large data context.

Efficient estimation of predictive accuracy gains for a potential feature without retraining is distinct from conventional approaches such as feature selection and active feature acquisition. More particularly, techniques described herein enable feature designers to more efficiently evaluate potential features without retraining in a task-independent manner.

In contrast to feature evaluation, feature selection seeks to remove a feature from a set of features rather than add a feature to a set of features. In feature selection, the goal is selecting a compact subset of features on which the predictor is currently trained. Traditional feature selection procedures can exploit intrinsic classifier properties (e.g., future weights in linear models, or split statistics in decision trees), use multiple rounds of retraining with feature subsets (e.g., in so-called wrapper and filter meta-algorithms used in forward and backward elimination procedures), rely on prediction statistics obtained on instances with permuted or distorted feature values (e.g., in out-of-bag permutation testing and the family of RELIEF methods), or compute joint statistics of features and class labels (e.g., mutual information or the Hilbert-Schmidt Independence Criterion). Most feature selection methods either explicitly or implicitly incorporate the predictor retraining procedure, and do not address the potential feature relevance problem where the existing predictor is a black box that is not retrained, and the data available is its predictions on a validation dataset.

Active feature acquisition aims to incrementally select individual feature values based by estimating their expected utility, and can be viewed as a feature-based complement to traditional active learning methods. Again, retraining the predictor is part of the problem setting, and computational costs are significant due to computation of value-of-information that is included in the approach.

Figure 7:
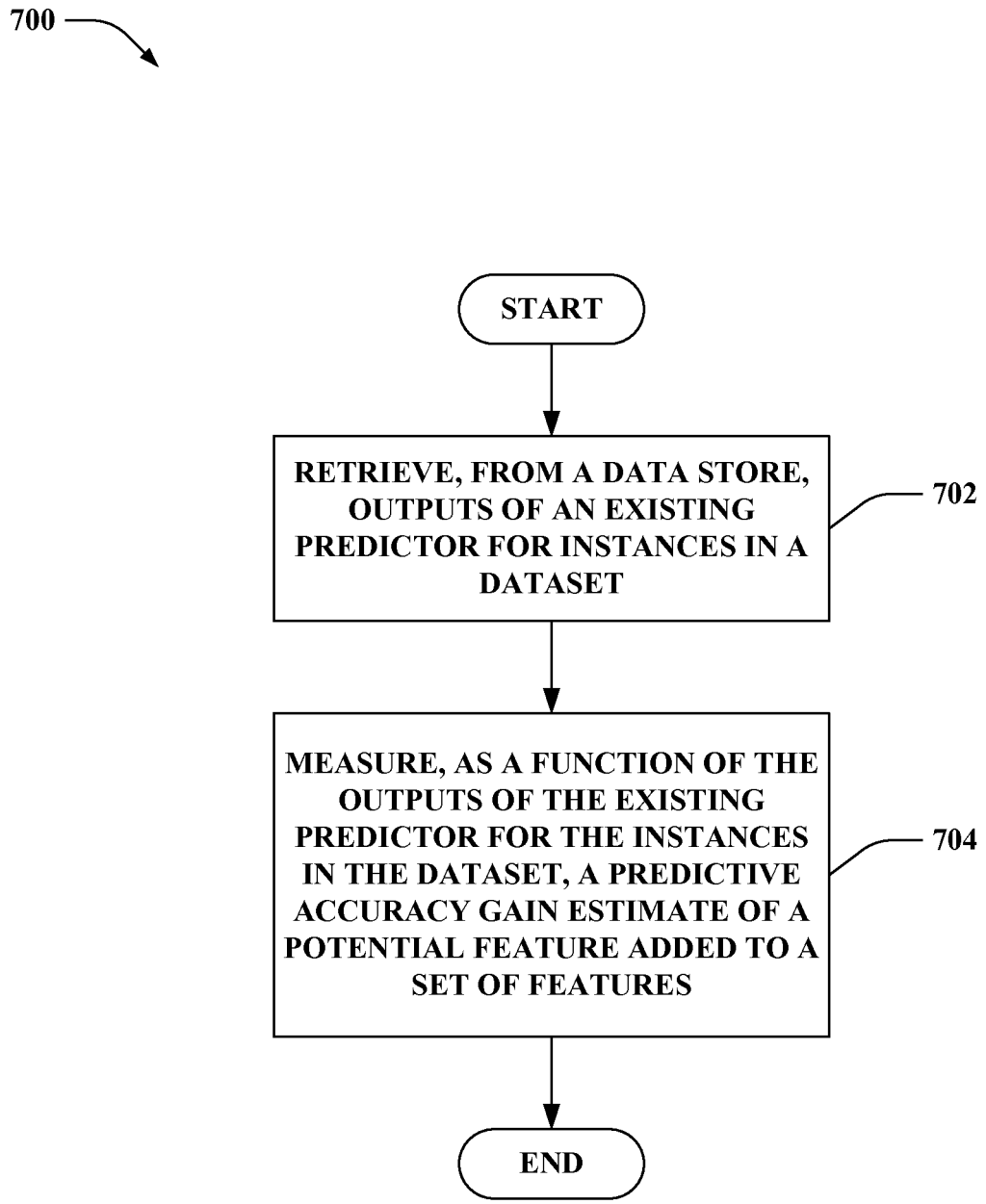
FIG. 7 is a flow diagram that illustrates an exemplary methodology for estimating predictive accuracy gains for a potential feature.
Figure 8:
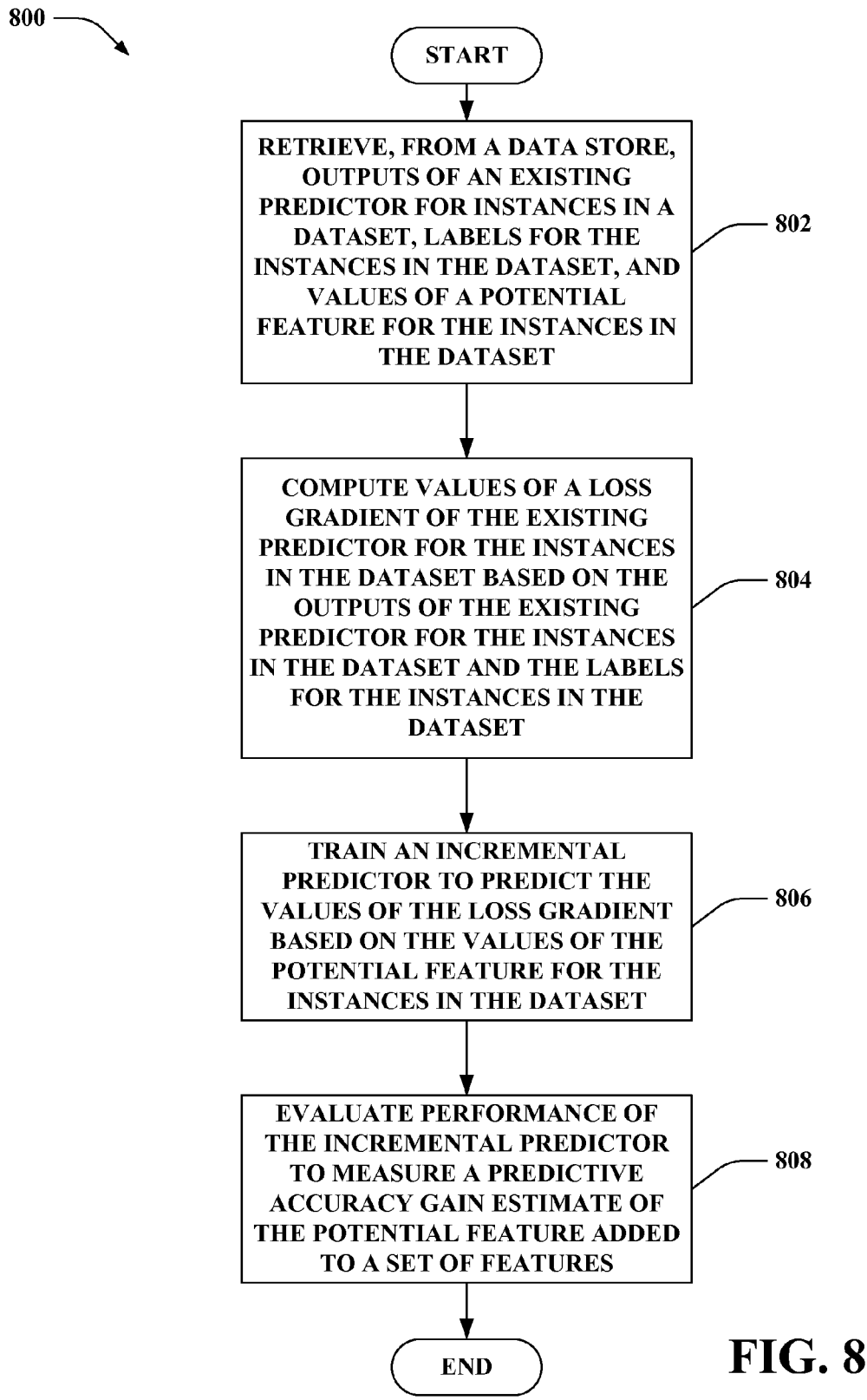
FIG. 8 is a flow diagram that illustrates an exemplary methodology for estimating predictive accuracy gains of a potential feature by training a predictor to predict values of a loss gradient based on values of the potential feature.

FIGS. 7-8 illustrate exemplary methodologies relating to estimating a predictive accuracy gain of a potential feature added to a set of features. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 7 illustrates a methodology 700 for estimating predictive accuracy gains for a potential feature. At 702, outputs of an existing predictor for instances in a dataset can be retrieved from a data store. The existing predictor can be trained on a set of features. At 704, a predictive accuracy gain estimate of a potential feature added to the set of features can be measured as a function of the outputs of the existing predictor for the instances in the dataset. The predictive accuracy gain estimate can be measured without training an updated predictor on the set of features augmented by the potential feature.

According to an example, labels for the instances in the dataset and values of the potential feature for the instances in the dataset can additionally be retrieved from the data store. The labels can be target outputs being predicted for the instances in the dataset. Moreover, the predictive accuracy gain estimate of the potential feature added to the set of features can be measured as a function of the outputs of the existing predictor for the instances in the dataset, the labels for the instances in the dataset, and the values of the potential feature for the instances in the dataset.

Now referring to FIG. 8, illustrated is a methodology 800 for estimating predictive accuracy gains of a potential feature by training a predictor to predict values of a loss gradient based on values of the potential feature. At 802, outputs of an existing predictor for instances in a dataset, labels for the instances in the dataset, and values of a potential feature for the instances in the dataset can be retrieved from a data store. At 804, values of a loss gradient of the existing predictor for the instances in the dataset can be computed based on the outputs of the existing predictor for the instances in the dataset and the labels for the instances in the dataset. At 806, an incremental predictor can be trained to predict the values of the loss gradient based on the values of the potential feature for the instances in the dataset. At 808, performance of the incremental predictor can be evaluated to measure a predictive accuracy gain estimate of the potential feature added to the set of features.

Figure 9:
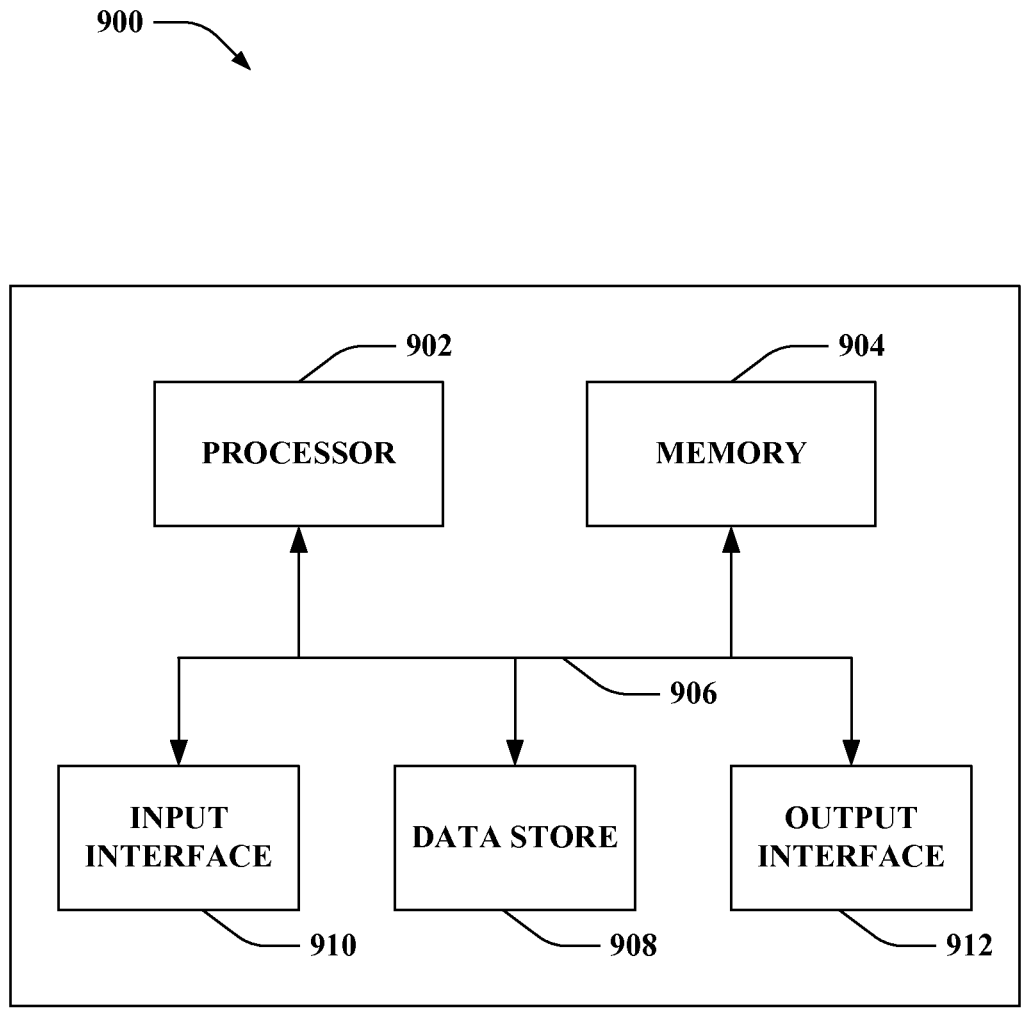
FIG. 9 illustrates an exemplary computing device.

Referring now to FIG. 9, a high-level illustration of an exemplary computing device 900 that can be used in accordance with the systems and methodologies disclosed herein is illustrated. For instance, the computing device 900 may be used in a system that estimates a predictive accuracy gain of a potential feature added to a set of features. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store outputs of an existing predictor, labels, values of a potential feature, and so forth.

The computing device 900 additionally includes a data store 908 that is accessible by the processor 902 by way of the system bus 906. The data store 908 may include executable instructions, outputs of an existing predictor, labels, values of a potential feature, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method executed by a computer processor, the method comprising:
   retrieving, from a data store, outputs of an existing predictor for instances in a dataset, labels for the instances in the dataset, and values of a potential feature for the instances in the dataset, wherein the existing predictor is trained on a set of features;
   computing values of a loss gradient of the existing predictor for the instances in the dataset based on the outputs of the existing predictor for the instances in the dataset and the labels for the instances in the dataset;
   training an incremental predictor to predict the values of the loss gradient based on the values of the potential feature for the instances in the dataset;
   evaluating performance of the incremental predictor to measure a predictive accuracy gain estimate of the potential feature added to the set of features.

2. The method of claim 1, wherein the labels are target outputs being predicted for the instances in the dataset.

3. The method of claim 1, wherein training the incremental predictor to predict the values of the loss gradient based on the values of the potential feature for the instances in the dataset further comprises selecting the incremental predictor from a class of predictors, wherein the incremental predictor maximizes a correlation between the values of the potential feature for the instances in the dataset and the values of the loss gradient.

4. The method of claim 1, wherein evaluating the performance of the incremental predictor further comprises computing a correlation between outputs of the incremental predictor and the values of the loss gradient.

5. The method of claim 4, wherein the predictive accuracy gain estimate is the correlation between the outputs of the incremental predictor and the values of the loss gradient.

6. The method of claim 4, wherein, when the correlation between the outputs of the incremental predictor and the values of the loss gradient is non-zero, the predictive accuracy gain estimate signifies that the potential feature likely improves predictive accuracy if an updated predictor is trained on the set of features augmented by the potential feature.

7. The method of claim 1, wherein the loss gradient is based on a derivative of a loss function with respect to an output of a predictor.

8. The method of claim 7, wherein the loss function is one of a log loss function, a cross-entropy function, a hinge loss function, a squared loss function, or a normalized discounted cumulative gain (NDCG).

9. The method of claim 1, further comprising performing a bootstrap test to evaluate whether a correlation between outputs of the incremental predictor and the values of the loss gradient is non-spurious.

10. The method of claim 1, wherein the dataset is a training dataset upon which the existing predictor is trained.

11. The method of claim 1, wherein the dataset is a validation dataset upon which the existing predictor is validated.

12. The method of claim 1, wherein the predictive accuracy gain estimate is measured without training an updated predictor on the set of features augmented by the potential feature.

13. A system that evaluates a predictive accuracy gain estimate of a potential feature, comprising:
   a processor; and
   a memory that comprises components that are executable by the processor, the components comprising:
      a loss evaluation component that computes values of a loss gradient of an existing predictor for instances in a dataset based on outputs of the existing predictor for instances in the dataset and labels for the instances in the dataset;
      a learner component that trains an incremental predictor to predict the values of the loss gradient based on values of the potential feature for the instances in the dataset; and
      a measurement component that measures the predictive accuracy gain estimate of the potential feature added to a set of features based on outputs of the incremental predictor and the values of the loss gradient.

14. The system of claim 13, wherein the measurement component further computes a correlation between the outputs of the incremental predictor and the values of the loss gradient.

15. The system of claim 13, wherein the existing predictor is trained on the set of features which lacks the potential feature.

16. The system of claim 13, wherein the loss evaluation component retrieves, from a data store, the outputs of the existing predictor for the instances in the dataset, the labels for the instances in the dataset, and the values of the potential feature for the instances in the dataset.

17. The system of claim 13, wherein the learner component selects the incremental predictor from a class of predictors, wherein the incremental predictor maximizes a correlation between the values of the potential feature for the instances in the dataset and the values of the loss gradient.

18. The system of claim 13, wherein a loss function, upon which the loss evaluation component computes the values of the loss gradient, is one of a log loss function, a cross-entropy function, a hinge loss function, a squared loss function, or a normalized discounted cumulative gain (NDCG).

19. The system of claim 13, the components further comprising a validation component that performs a bootstrap test to determine a confidence that the potential feature improves a prediction of the existing predictor.

20. A computer-readable storage device including computer-executable instructions that, when executed by a processor, cause the processor to perform acts including:
- retrieving, from a data store, outputs of an existing predictor for instances in a dataset, labels for the instances in the dataset, and values of a potential feature for the instances in the dataset;
- computing values of a loss gradient of the existing predictor for the instances in the dataset based on the outputs of the existing predictor for the instances in the dataset and the labels for the instances in the dataset;
- training an incremental predictor to predict the values of the loss gradient based on the values of the potential feature for the instances in the dataset; and
- evaluating performance of the incremental predictor to measure a predictive accuracy gain estimate of the potential feature added to a set of features.

* * * * *